United States Patent [19]

Dufour et al.

[11] Patent Number: 5,528,299
[45] Date of Patent: Jun. 18, 1996

[54] CODING SYSTEM FOR DIGITAL SIGNALS CORRESPONDING TO TELEVISION PICTURES AND CORRESPONDING DECODING SYSTEM

[75] Inventors: Cécile Dufour, Paris; Gilles Nocture, L'Hay-les-Roses, both of France

[73] Assignee: U.S. Philips Corporation, New York, N.Y.

[21] Appl. No.: 408,448

[22] Filed: Mar. 22, 1995

Related U.S. Application Data

[63] Continuation of Ser. No. 853,734, filed as PCT/NL91/00191, Oct. 8, 1991 published as WO92/06563, Apr. 16, 1992, abandoned.

[30] Foreign Application Priority Data

| Oct. 9, 1990 | [FR] | France | 9012413 |
| Dec. 18, 1990 | [FR] | France | 9015823 |
| Jun. 21, 1991 | [FR] | France | 9107656 |
| Jul. 9, 1991 | [FR] | France | 9108588 |

[51] Int. Cl.⁶ ............................ H04N 7/36; H04N 7/12
[52] U.S. Cl. .................... 348/412; 348/389; 348/409
[58] Field of Search .................... 348/401, 402, 348/405, 407, 409, 411, 412, 413, 415, 416, 426, 389

[56] References Cited

U.S. PATENT DOCUMENTS

| 4,470,146 | 9/1984 | Yatsuzuka et al. | 348/405 |
| 4,703,350 | 10/1987 | Hinman | 348/416 |
| 5,040,061 | 8/1991 | Yonemitsu | 348/416 |
| 5,055,927 | 10/1991 | Keesen et al. | 348/426 |

Primary Examiner—Tommy P. Chin
Assistant Examiner—A. Au
Attorney, Agent, or Firm—Leroy Eason

[57] ABSTRACT

Apparatus for coding digital signals corresponding to television images of a given definition includes an image reconstruction stage having a first path for reconstructing the image in accordance with a higher definition and a second path, in parallel with the first path, for reconstructing the image in accordance with a reduced definition. A corresponding decoding device includes a decoding stage for decoding the coded digital signals, a stage for reconstructing a reduced definition image on the basis of the decoded signals, a stage for motion compensation on the basis of motion information components of the coded digital signals, and a stage for image prediction based on output signals of the image reconstruction stage and the motion information components.

11 Claims, 5 Drawing Sheets

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 2A

| 1 | 2 | 6 | 7 | 23 | 24 | 28 | 29 |
|---|---|---|---|---|---|---|---|
| 3 | 5 | 8 | 13 | 25 | 27 | 30 | 43 |
| 4 | 9 | 12 | 14 | 26 | 31 | 42 | 44 |
| 10 | 11 | 15 | 16 | 32 | 41 | 45 | 54 |
| 17 | 18 | 22 | 33 | 40 | 46 | 53 | 55 |
| 19 | 21 | 34 | 39 | 42 | 52 | 56 | 61 |
| 20 | 35 | 38 | 48 | 51 | 57 | 60 | 62 |
| 36 | 37 | 49 | 50 | 58 | 59 | 63 | 64 |

CODING SYSTEM FOR DIGITAL SIGNALS CORRESPONDING TO TELEVISION PICTURES AND CORRESPONDING DECODING SYSTEM

This is a continuation of U.S. patent application Ser. No. 07/853,734, filed as PCT/NL91/00191, Oct. 8,1991 published as WO92/06563, Apr. 16, 1992, now abandoned.

BACKGROUND OF THE INVENTION

1. Field of the Invention

The invention relates to a device for coding digital signals corresponding to television images having a given definition, comprising:

(A) a stage for selecting the coding mode of signals to be coded from current input signals to the coding device on the one hand and from predicted signals on the other hand, based on the preceding input signals of the device, said stage supplying the signals to be coded and coding mode information;

(B) a coding stage;

(C) an image reconstruction stage in a first path for reconstructing the image in accordance with said given definition;

(D) a stage for estimating the motion between images, supplying motion information;

(E) a stage for predicting from output signals of said image reconstruction and/ motion estimation stages the output signals of said prediction stage constituting said predicted signals transmitted to said coding mode selection stage.

The invention also relates to a device for decoding coded digital signals which have been transmitted and/or stored after processing in a device for coding digital signals corresponding to television images of a given definition, said coding device comprising:

(a) a stage for selecting the coding mode of the signals to be coded from current input signals of said coding device on the one hand and from predicted signals on the other hand, based on the preceding input signals of said device, said preceding and current input signals being considered as blocks of a given size representing a subdivision of images and being treated independently;

(b) a coding stage;

(c) an images reconstruction stage for reconstructing the image in accordance with said given definition on the one hand and in accordance with a reduced definition on the other hand;

(d) a stage for estimating the motion between images; and supplying motion information;

(e) for supplying said predicted signals, a stage for predicting from the output signals of said motion estimation and image reconstruction stages the information components which are additional and relative to the estimated motion between images and to the selected coding mode being intended, like the coded signals, for transmission and/or storage.

This invention can be used to advantage in the field of television picture reception in accordance with two definition levels for ensuring the restitution of high-definition images of excellent quality which can nevertheless be received by conventional television receivers having a lower definition.

2. Description of the Related Art

The transmission of high-definition digital television images is currently the subject of intensive research. However, the industries concerned have realised at a very early stage that this novel service would only be successful if the high-definition programs could be received not only by high-definition television receivers but by conventional receivers as well.

Such a transmission, which is referred to as "compatible", is effectively ensured if a fraction of the multitude of data corresponding to the high-definition program can easily be taken and used for the conventional receiver to supply the normal television images (compatible images: 625 lines, 50 Hz, 2:1, 16/9 frame). This technical solution provides the possibility of simultaneously transmitting conventional television programs and high-definition television programs with a certain economy of information output (the output thus economized is substantially that which would correspond to the transmission of high definition TV images alone).

The separation of the multitude of high-definition data into two parts one corresponding to mutually compatible data (which will hereinafter be referred to as TV information components), and to the other to complementary additional data (relating only to the high-definition images and hereinafter referred to as HD or HDTV information components), constitutes a drawback at the level of the high-definition coder (or HD coder) upon transmission, because the entire multitude of data must comprise the information components from which compatible images can be subsequently reconstructed. The positioning of these two information components may particularly lead to a degradation of the high-definition image quality.

Therefore, the solution which currently seems to be the best to ensure compatible transmission is based on the use of a coder employing an orthogonal transform such as a discrete cosine transform (DCT) which acts on data blocks into which each image is divided. The reconstruction of the compatible images based on high-definition data is realised by means of a cut-off in the frequency domain: for each high-definition image block to which the orthogonal transform is applied only those coefficients resulting from this transform which correspond to the lowest frequencies are transmitted to the compatible image decoder (or TV decoder). The coefficients thus selected become the constituent coefficients of new image blocks having dimensions which in this case are twice smaller than those of the original blocks in each horizontal and vertical direction.

The compatible images thus obtained have satisfactory quality as long as the TV decoders do not incorporate motion compensation devices. When such devices are provided, a prediction before the motion is necessary, which may be effected with the high-definition resolution for maintaining the image quality during decoding of the high-definition images. Some disagreement is found between the contents of the image blocks thus predicted during coding and high-definition decoding and the image blocks predicted during decoding of compatible images. Effects which degrade the quality of the compatible images are then produced, which effects are cumulative because of the recursivity of the device.

SUMMARY OF THE INVENTION

It is one object of the invention to provide a device for coding digital signals corresponding to television images, and which avoids the aforesaid drawbacks.

To this end the invention relates to a coding device as defined in the opening paragraph and which is characterized in that said digital signals are processed as blocks of a given size representing a subdivision of images and are treated independently. The image reconstruction stage also comprises a second image reconstruction path in accordance with a reduced definition, which path is situated parallel to said first path, and in that the prediction stage comprises a circuit for reconstituting the image by combining the output signals of said first and second reconstruction paths.

The document "Coding Television Signals at 320 and 64 kbits" G. Kummerfeldt et at., Proceedings of the SPIE, December 1985, Cannes (France), vol. 594, Image Coding, pp. 119–128 describes, particularly with reference to FIG. 2, a coding device (of variable length in this case) for reconstruction of the image and prediction, based on said reconstruction, of the signals to be coded. However, such a device completely disregards the problem in the case of transmitting images having two definition levels, viz. the problem of supplying the information components which are simultaneously necessary for transmitting and reconstituting the television images at the receiver end in accordance with these two definition levels, notably high-definition television images and compatible television images. In contrast thereto, the structure proposed in this Application provides a satisfactory technical solution to this problem.

In a particular embodiment, in which essentially signals corresponding to pixels are used, the invention relates to a coding device in which the coding stage is a variable length coding chain comprising an orthogonal transform circuit, a scanning conversion circuit, a quantizing circuit, a variable length coding circuit, a memory circuit and a rate control circuit and in which the first path of the reconstruction stage comprises a series arrangement of:

(a) an inverse quantizing circuit;

(b) an inverse scanning conversion circuit;

(c) an inverse orthogonal transform stage;

(d) a circuit for reconstructing the signal in accordance with said given definition, as would be decoded after transmission, but for transmission errors; characterized in that in said image reconstruction stage the second reconstruction path comprises:

(a) said inverse quantizing circuit;

(b) said inverse scanning conversion circuit;

(c) a clipper circuit for taking a given fraction of the signals at the output of said inverse quantizing circuit;

(d) an inverse orthogonal transform circuit;

(e) a circuit for reconstructing the signal having a reduced definition as would be decoded after transmission, but for transmission errors;

(f) a memory for storing said reconstructed signal; (g) a motion compensation circuit between the output of said memory and said circuit for reconstructing the reduced definition signal;

and in that said image reconstituting circuit comprises:

(h) a multiplier for multiplying the output signal of the first reconstruction path by a coefficient $\alpha$ between 0 and 1;

(i) a multiplier for multiplying the output signal of the second reconstruction path by the coefficient $(1-\alpha)$, a phase restoring and resampling circuit being arranged between said output of the second reconstruction path and the corresponding input of the associated multiplier;

(j) an adder for adding the output signals of said multipliers;

(k) a weighting memory for storing the output signal of said adder;

(l) a prediction circuit for receiving the output signal of said weighting memory and the motion information components supplied by said motion estimation stage.

In a second embodiment, whose operation is essentially based on coefficients resulting from an orthogonal transform of said signals corresponding to pixels, the invention relates particularly to a coding device in which the coding stage is a variable length coding chain comprising a quantizing circuit, a variable length coding circuit, a memory circuit and a rate control circuit, in which the stage for selecting the coding mode comprises a series arrangement of:

(a) an orthogonal transform stage for said input current signals;

(b) an inter/intradecision circuit for also receiving said predicted signals; and in which first reconstruction path comprises a series arrangement of:

(c) an inverse quantizing circuit;

(d) a circuit for reconstituting the block in accordance with said given definition;

(e) an inverse orthogonal transform stage;

(f) a memory for the information components of said given definition; characterized in that in said reconstruction stage the second reconstruction path comprises:

(a) said inverse quantizing circuit;

(b) a clipper circuit for taking a given fraction of the signals present at the output of said inverse quantizing circuit;

(c) a circuit for reconstituting the block in accordance with said reduced definition;

(d) an inverse orthogonal transform stage;

(e) a memory for the information components of said reduced definition; and in that the image reconstitution circuit comprises:

(f) at the output of said first path, a first reconstitution branch comprising a first prediction circuit with motion compensation, a first orthogonal transform circuit and a low-frequency clipper circuit for eliminating, in the coefficients resulting from said orthogonal transform, a given fraction representing the coefficients of the lowest frequency;

(g) at the output of the second path, a second reconstitution branch comprising a second prediction circuit with motion compensation and a second orthogonal transform circuit;

(h) a circuit for combining the output signals of said first and second branches for supplying said predicted signals transmitted to said coding mode selection stage.

In a perfected modification of this second embodiment, the coding device is characterized in that the image reconstitution circuit for the prediction stage comprises, between the output of said second reconstitution branch and the corresponding input of said combination circuit, a weighted mixing circuit comprising:

(a) a multiplier for multiplying the output signal of the first branch by a coefficient $\alpha$ between 0 and 1, which signal corresponds to said coefficients eliminated by the low-frequency clipper circuit;

(b) a multiplier for multiplying the output signal of said second branch by the coefficient $(1-\alpha)$;

(c) an adder for adding the output signals of said multipliers, the output signal of said adder being applied to the corresponding input of the combination circuit.

It is another object of the invention to provide a device for decoding digital signals corresponding to television images with which reduced definition images and high-definition images of good quality can be reconstituted.

To this end the invention relates to a decoding device as defined in the opening paragraph and is characterized in that it comprises, in association with a decoding stage:

(A) a stage for reconstructing the image in accordance with said reduced definition from the decoded signals;

(B) a stage for motion compensation based on said additional information components;

(C) a stage for prediction based on the output signals of said image reconstruction stage.

In a particular embodiment the invention relates to a decoding device in which the decoding stage is a variable length decoding chain for coded digital signals previously transmitted and/or stored after treatment in a variable length coding chain, said decoding chain comprising a memory circuit, a variable length decoding circuit, an inverse quantizing circuit, an inverse normalization circuit, an inverse scanning conversion circuit and an inverse orthogonal transform circuit, and is characterized in that:

(A) the stage for reconstructing the image in accordance with said reduced definition comprises a series arrangement of:

(a) a clipper circuit for taking a given fraction of the signals after decoding;

(b) an inverse orthogonal transform circuit;

(c) an adder whose first input receives the output signal of said inverse orthogonal transform circuit;

(d) a memory for storing the image reconstituted in accordance with the reduced definition and being present at the output of said adder;

(e) a first circuit for compensating motion, receiving the output signal of said memory and the motion information components, and having its output connected to the second input of said adder;

(B) the prediction stage comprises:

(f) a first multiplier for multiplying the output signals of said decoding device by a coefficient $\alpha$ between 0 and 1;

(g) a second multiplier for multiplying the output signal of said stage for reconstructing the image in accordance with said reduced definition by the coefficient $(1-\alpha)$, a phase restoring and resampling circuit being arranged between said output and the corresponding input of said second multiplier;

(h) an adder for adding the output signals of said first and second multipliers;

(i) a memory for weighted mixing of images in accordance with said given definition and in accordance with said reduced definition;

(C) the motion compensation stage comprises:

(j) a second motion compensation circuit receiving the output signal of said prediction stage and the additional motion and coding mode information components;

(k) an adder for adding the output signals of said decoding chain and said second motion compensation circuit.

In a second embodiment the invention relates to a decoding device in which the decoding stage is a variable length decoding chain for coded digital signals previously transmitted and/or stored after treatment in a variable length coding chain, said decoding chain comprising a memory circuit, a variable length decoding circuit, an inverse quantizing circuit, an inverse normalization circuit and an inverse orthogonal transform circuit and is characterized in that, with a first memory for storing information components in accordance with said given definition being arranged at the output of said decoding chain, (A) the stage for reconstructing the image in accordance with said reduced definition comprises a series arrangement of:

(a) a clipper circuit for taking a given fraction of the signals after decoding;

(b) a circuit for reconstituting the block in accordance with said reduced definition;

(c) an inverse orthogonal transform circuit;

(d) a second memory for storing information components in accordance with said reduced definition;

(B) the motion compensation stage comprises first and second motion compensation circuits each receiving the output signal of one of said two memories for storing information components and for storing the coding mode and motion information components;

(C) the prediction stage comprises:

(f) at the output of that one of said motion compensation circuits which follows said memory for storing the information components in accordance with the given definition, a first reconstitution branch comprising a first orthogonal transform circuit and a low-frequency clipper circuit for eliminating, in the coefficients resulting from said orthogonal transform, a given fraction representing the coefficients of the lowest frequency;

(g) at the output of the other one of said motion compensation circuits which follows said memory for storing the information components in accordance with the reduced definition, a second reconstitution branch comprising a second orthogonal transform circuit;

(h) at the output of said first and second parallel branches a circuit for combining the output signals of said first and second branches;

(i) an adder for adding the output signals of said combination circuit and of the inverse quantizing circuit of the variable length decoding chain, arranged between said inverse quantizing circuit and the inverse orthogonal transform circuit following the last-mentioned circuit.

In a perfected modification of this second embodiment the decoding device is characterized in that the prediction stage also comprises, between the output of said second reconstitution branch and the corresponding input of said combination circuit, a weighted mixing circuit comprising:

(a) a multiplier for multiplying the output signal of said first branch by a coefficient $\alpha$ between 0 and 1, which signal corresponds to said coefficients eliminated by the low-frequency clipper circuit;

(b) a multiplier for multiplying the output signal of said second branch by the coefficient $(1-\alpha)$;

(c) an adder for adding the output signals of said multipliers, the output signal of said adder being applied to said corresponding input of the combination circuit.

BRIEF DESCRIPTION OF THE DRAWINGS

These and other aspects of the invention will be apparent from and elucidated with reference to the embodiments described hereinafter with reference to the accompanying drawings in which

FIGS. 2A and 2B show scanning patterns of the coefficients of the traditional type and of the modified zigzag type;

FIG. 3 shows a second embodiment of a coding device according to the invention;

DESCRIPTION OF THE PREFERRED EMBODIMENTS

Figure 1:
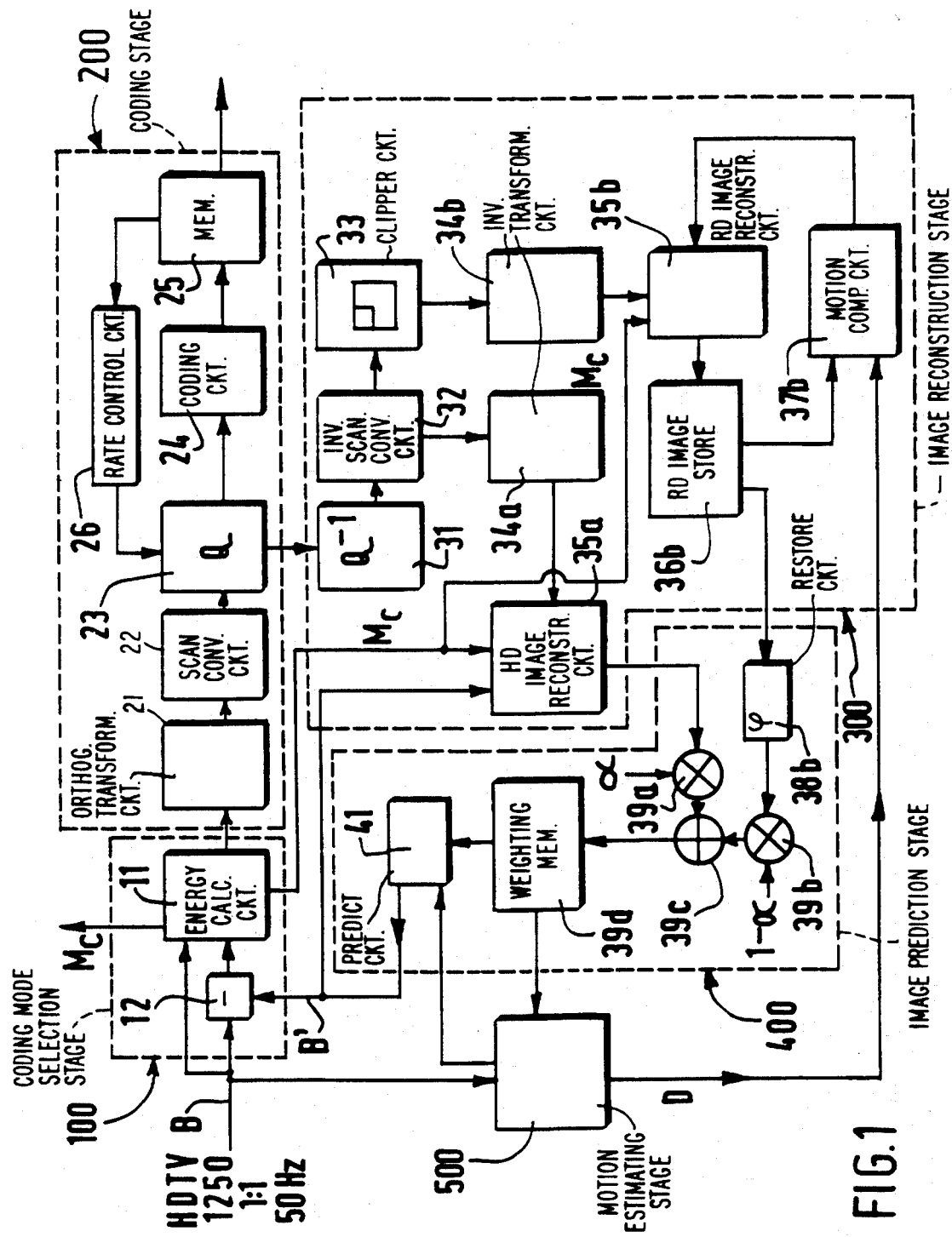
FIG. 1 shows a first embodiment of a coding device according to the invention.

The coding device shown in a first embodiment in FIG. 1 comprises coding mode selection stage 100 for selecting the coding mode for the signals to be coded, which are digital signals comprising blocks of a fixed size each representing a subdivision of a received HDTV image (HDTV images, 1250 lines, 1:1, 50 Hz) and each being treated independently. In this example the stage 100 is an inter/intradecision circuit which comprises an energy calculation circuit 11 which first calculates, from the present input signals of to the device, the energy per image block in signal components other than the DC component, the reference B denoting a current block. The circuit 100 also comprises a subtracter 12 which receives the samples corresponding to the present block B and the samples corresponding to a predicted block B' supplied by a prediction stage 400 which will be described hereinafter. After the subtraction (B—B') has been effected, the energy calculation circuit 11 determines the energy contained in the block of samples constituted at the output of the subtracter 12 (always without a DC component) and subsequently, in accordance with the result of a comparison of the two energies thus calculated, it selects either the one or the other of two coding modes referred to as interframe coding (B—B' is coded) and intraframe coding (B is coded) and abbreviated as intercoding and intracoding, respectively. An additional information component $M_c$ specifying the selected coding mode is supplied by the circuit 100, because it will be necessary for reconstructing the images, particularly at the receiver end.

The coding mode selection stage 100 is followed by a coding stage, 200 in this case a variable length coding chain (but in another type of coding stage, a fixed length coding chain may also be used). This coding chain comprises an orthogonal transform circuit 21 (a discrete cosine transform circuit for blocks comprising, for example 8×8 coefficients, referred to as DCT 8×8 is assumed here and in the following description, but the type of orthogonal transform used and the number of coefficients are not critical to the invention in any way), a scanning conversion circuit 22, a quantizing circuit 23, a variable length coding circuit 24, a memory circuit 25 and a rate control circuit 26 supplying a normalization signal which is applied to the circuit 23.

The scanning i.e. the order of reading, of the coefficients supplied by the orthogonal transform circuit 21, has a zigzag modified pattern in this case. Without this example being limitative, FIG. 2A shows the case where the size of the blocks is 8×8 for the high-definition images and 4×4 for the reduced definition images and the order of reading the coefficients in the case of a traditional zigzag scanning pattern, and FIG. 2B shows the order of reading in the case of a modified zigzag scanning pattern.

The signals at the output of the quantizing circuit 23 are applied to an image reconstruction stage 300 formed in the following way. This stage 300 comprises an inverse quantizing circuit 31, and at the output thereof a first path for reconstructing an image signal in accordance with said given high definition, which first path comprises an inverse scanning conversion circuit 32, an inverse orthogonal transform circuit 34a (inverse discrete cosine transform effected on blocks of 8×8 coefficients, referred to as inverse DCT 8×8) and a circuit 35a for reconstructing the high-definition signal such as would be, but for transmission errors (this circuit 35a receiving the signals B' and $M_c$ for said reconstruction).

The stage 300 also comprises, at the output of the inverse scanning conversion circuit 32, a second path for reconstructing an image of reduced definition (here the compatible TV image, whereas the image of a given definition is a high-definition television image), which second path comprises a clipper circuit 33 by which a given fraction of the block coefficients can be selected, in this case the sixteen first coefficients (i.e. a quarter) scanned in a modified zigzag pattern, an inverse orthogonal transform circuit 34b (inverse discrete cosine transform, referred to as inverse DCT 4×4 because the new block thus constituted does not comprise more than 4×4 coefficients), a circuit 35b for reconstituting the compatible television signal as would be decoded, but for transmission errors, a memory 36b for storing the signal thus reconstituted and a circuit 37b for motion compensation. The output signals of the circuits 35a and 36b constitute the output signals of the stage 300.

These output signals are applied to the previously mentioned prediction stage 400. This stage 400 is a circuit for reconstituting the image by combining the output signals of said first and second reconstruction paths and comprises a multiplier 39a and a multiplier 39b for multiplying the output signals of said first and second paths by a coefficient α and a coefficient (1-α), respectively, (α being between 0 and 1), and an adder 39c for adding the output signals of said multipliers and a weighting memory 39d storing the output signal of said adder. A phase restoring and resampling circuit 38b is arranged upstream of the multiplier 39b for realigning the number of pixels constituting the images at the input of the multiplier and for restoring the phase of these images (for reasons of phase shifting due to the inverse DCT 4×4 orthogonal transform). The output signal of the memory 39d is applied to a prediction circuit 41. This circuit 41, which is used for supplying the predicted blocks B', is provided for receiving the output signal of the memory 39d and the motion information components supplied by a motion estimation stage 500.

The stage 500 conventionally comprises a correlator of block between the current image present at the input of the device and the reconstituted image present at the output of the memory 39d, the output signal of this memory 39d being also applied to said stage 500. Said motion information components are motion vectors indicating the displacement between a block of a present image and the corresponding block of the next considered image. The prediction circuit 41 consists in this case of a circuit for addressing and reading the memory 39d, which addressing is effected as a function of said motion vectors.

Figure 3:
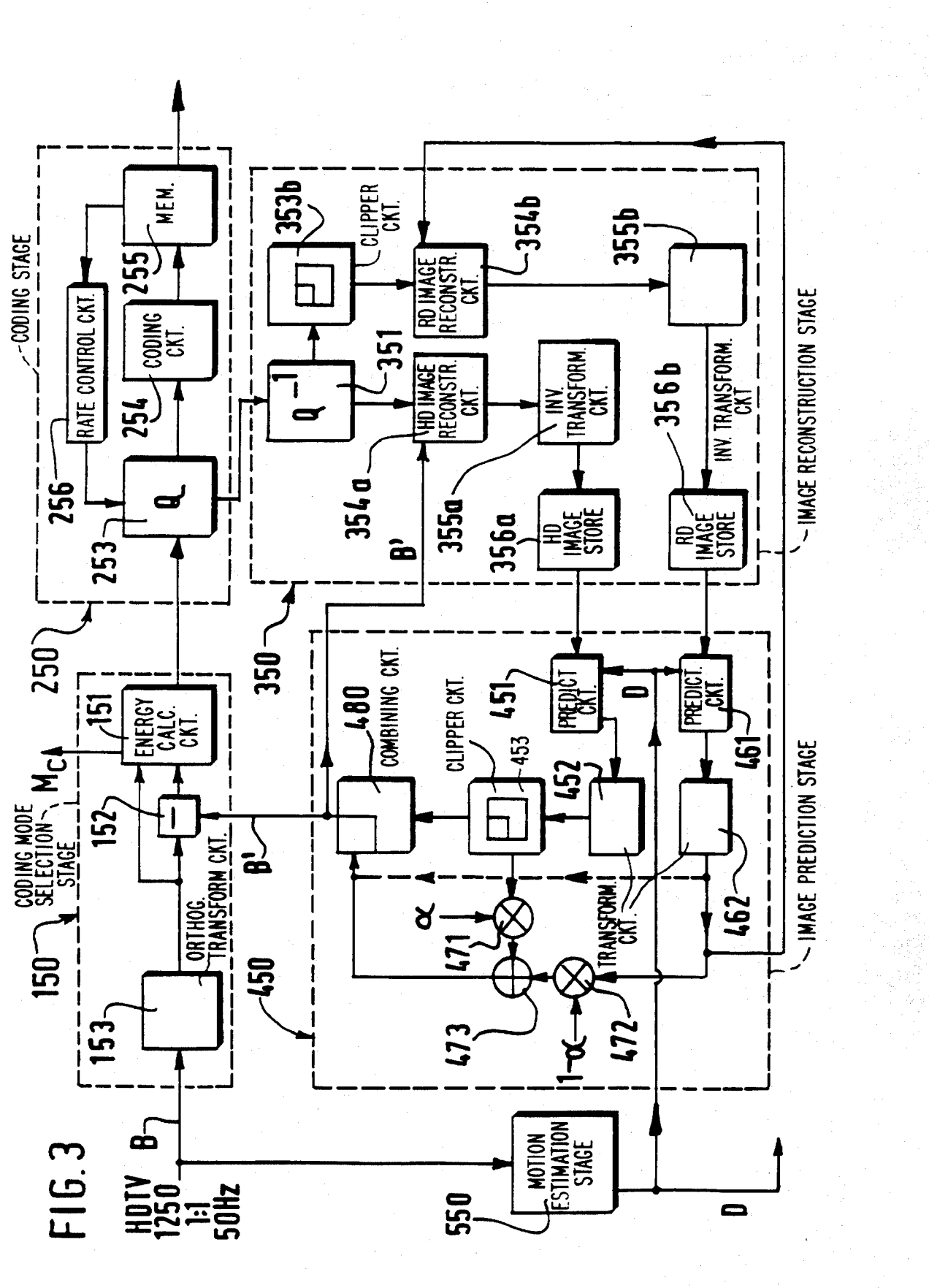

The coding device shown in FIG. 3 is a second embodiment, which does not act on signals corresponding to image pixels but instead on coefficients resulting from an orthogonal transform (for example a discrete cosine transform) of the signals corresponding to the pixels. The device shown in FIG. 3 likewise comprises a stage 150 for selecting the cooling mode of the signals to be coded, not only comprises an inter/intradecision circuit composed of an energy calculation circuit 151 and a subtracter 152 whose structure and operation are similar to those of circuit 11 and subtracter 12, respectively, in FIG. 1 but also, upstream of these two elements, an orthogonal transform stage 153 (discrete cosine transform) for the present input signals to the coding device.

As in the case of FIG. 1, the coding mode selection stage 150 is followed by a coding stage 250 which is a variable length coding chain. This chain comprises a quantizing circuit 253, a variable length coding circuit 254, a memory circuit 255 and a rate control circuit 256 supplying a normalization signal which is applied to the circuit 253. The signals present at the output of said quantizing circuit 253 are applied to an image reconstruction stage 350 which is constituted in the following manner. It comprises a first path for reconstructing an image in accordance with said given high definition, said first path comprising an inverse quantizing circuit 351, a circuit 354a for reconstituting the block in accordance with said given high definition, an inverse orthogonal transform stage 355a (inverse DCT transform) and a memory 356a for storing the information components corresponding to said given high definition. The stage 350 also comprises, at the output of the quantizing circuit 253, a second path for reconstructing the image in accordance with said reduced definition, said second path comprising the inverse quantizing circuit 351, a clipper circuit 353b for taking a given fraction of the signals present at the output of the circuit 351, a circuit 354b for reconstituting the block in accordance with said reduced definition, an inverse orthogonal transform stage 355b (inverse DCT transform) and a memory 356b for information components in accordance with said reduced definition. The output signals of the memories 356a and 356b will be used for reconstituting the image prior to the selection of the signals to be coded and prior to coding and to this end they are applied to the prediction stage 450.

This stage 450 comprises, at the output of the first reconstruction path, a first reconstitution branch comprising a first prediction circuit 451 with motion compensation, a first orthogonal transform circuit 452 (DCT transform) and a low-frequency clipper circuit 453 with which, in the coefficients resulting from said orthogonal transform, a given fraction representing the coefficients corresponding to the lowest frequencies can be eliminated. In all the examples described, this fraction is equal to one quarter, but this value is not a non-limitative example. The stage 450 also comprises, at the output of the second reconstruction path, a second reconstitution branch comprising a second prediction circuit 461 with motion compensation and a second orthogonal transform circuit 462 (DCT transform). This stage 450 also comprises, at the outputs of said first and second parallel branches, a circuit 480 for combining the output signals of said low-frequency clipper circuit 453 and of the second orthogonal transform circuit 462 (DCT transform). This circuit 480 supplies the predicted signals which are applied to the coding mode selection stage.

Similarly as described hereinbefore, the motion information components are supplied by a motion estimation stage 550 which is identical to stage 500 of FIG. 1 and which addresses to the circuits 451 and 461 the motion vectors D authorizing the motion compensation in blocks during stages of constructing the predicted block B'. The vectors D, like the information components $M_c$, are also transmitted and/or stored, because they are necessary at the receiver end.

Reciprocally, when digital signals have already been coded in a coding device according to the invention, their decoding is also carried out pursuant this invention. A device for performing decoding is shown in FIG. 4 and comprises, in association with a decoding stage, a stage for reconstructing the image in accordance with said reduced definition, which stage is provided for operation based on decoded signals which are available in said given high definition and based on the transmitted coding mode and motion information components, and a stage for prediction based on said decoded signals and on the output signals of said image reconstruction stage, and, downstream of said image reconstruction stage, a motion compensation stage.

Figure 4:
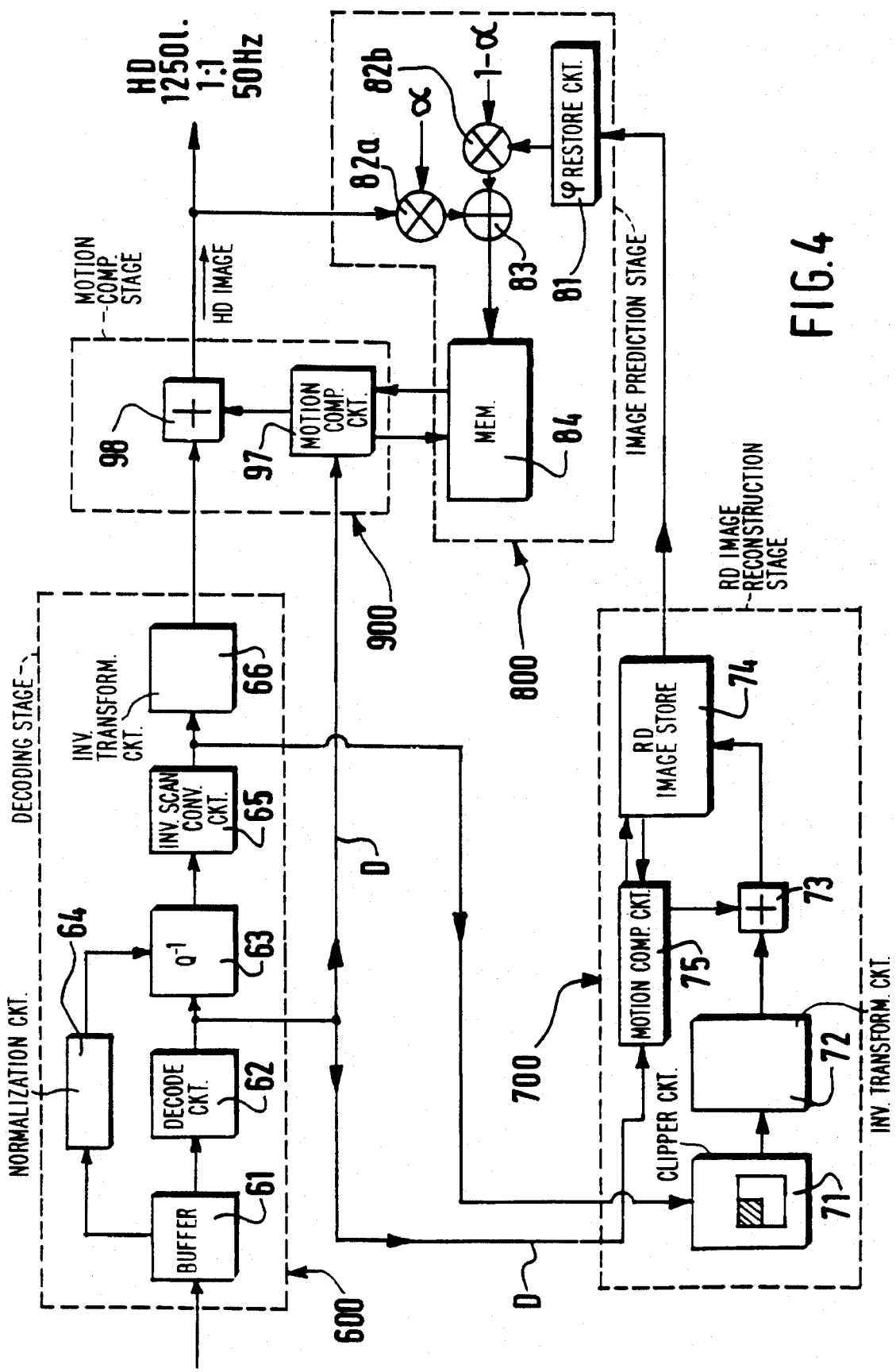
FIGS. 4 and 5 show two embodiments of a decoding device according to the invention.

In the embodiment shown in FIG. 4 the decoding device more specifically comprises a variable length decoding stage 600 constituting said decoding chain. This stage 600 comprises a buffer memory 61 receiving the input signals of the decoding device, i.e. all the signals previously coded and transmitted (or stored). These signals include coded digital signals obtained from initial high-definition television images and motion information components supplied by the motion estimation stage of the coding device, and coding mode information components supplied by the coding mode selection stage of the coding device. The buffer memory 61 is followed by a variable length decoding circuit 62, an inverse quantizing circuit 63 (connected to the buffer memory 61 via an inverse normalization circuit 64), an inverse scanning conversion circuit 65 and an inverse orthogonal transform circuit 66 (here an inverse discrete cosine transform circuit for blocks of 8×8 coefficients, referred to as inverse DCT 8×8). The circuit 65 performs a scanning operation in an inverse modified zigzag pattern (transform inverse to that described with reference to FIG. 2B). The variable length decoding stage 600 thus described thereby constitutes a first path for reconstructing a high-definition image.

The decoding device also comprises a stage 700 for reconstructing the reduced definition image, here a compatible TV image. In said device this stage constitutes a second path for reconstructing the reduced definition image, which path comprises a clipper circuit 71 which, similar to the circuit 33, enables a given fraction of the decoded signals to be selected, namely a given fraction of coefficients corresponding to a block (in this case the sixteen first coefficients in the order of modified zigzag scanning) and which is to this end provided at the output of the inverse scanning conversion circuit 65. This circuit 71 is followed by an inverse orthogonal transform circuit 72 (here an inverse discrete cosine transform, referred to as inverse DCT 4×4), and a memory 74 for storing the reconstituted reduced definition image.

The estimation of motion during coding and the selected coding mode are taken into account in this reconstitution. As has been described hereinbefore, the transmitted coded signals include motion information components resulting from the motion estimation and coding mode information components indicating the coding mode selection. These information components are applied to the stage 700 and to a motion compensation stage 900. This stage 900 comprises a motion compensation circuit 97 and an adder 98. In fact, the circuit 97 is a circuit for addressing a memory 84 (described hereinafter) which addressing takes the block displacements indicated by said motion information components into account. In the stage 700 the motion and coding mode information components are received after their decoding by a motion compensation circuit 75 which is also a circuit for addressing the memory 74, taking the block displacements indicated by the motion information components into account.

The images thus reconstructed with motion compensation are then applied to the adder 98 (for the high-definition images) and to an adder 73 (for the reduced definition images), respectively. The adder 98, which thus receives the output signal of the circuit 97 at its first input, receives the output signal of the inverse orthogonal transform circuit 66 of the stage 600 at its second input and supplies the reconstituted high-definition HDTV images (1250 lines, 2:1, 50 Hz) which correspond to the original high-definition images. The adder 73, which receives the output signal of the motion compensation circuit 75 at its first input, is arranged between the inverse orthogonal transform circuit 72, from which it receives the output signal at its second input, and a memory 74 to which its output signal is applied.

The decoding device also comprises a prediction stage 800, which stage comprises a first and a second multiplier 82*a* and 82*b* for multiplying the output signals of the adder 98 and the circuit 81 by a coefficient α between 0 and 1 and by the complementary coefficient (1-α), respectively, an adder 83 for adding the output signals of these multipliers, and a memory storing the output signal of this adder 83. This memory is the memory 84 mentioned hereinbefore and, due to the action of the multipliers, comprises a weighted mix of the reconstituted high-definition and reduced definition images which, after performance of the motion compensation, are present at the outputs of stages 600 and 700. A phase restoring and resampling circuit 81 is arranged at the output of the memory 74 between this output and the second multiplier 82*b*.

Figure 5:
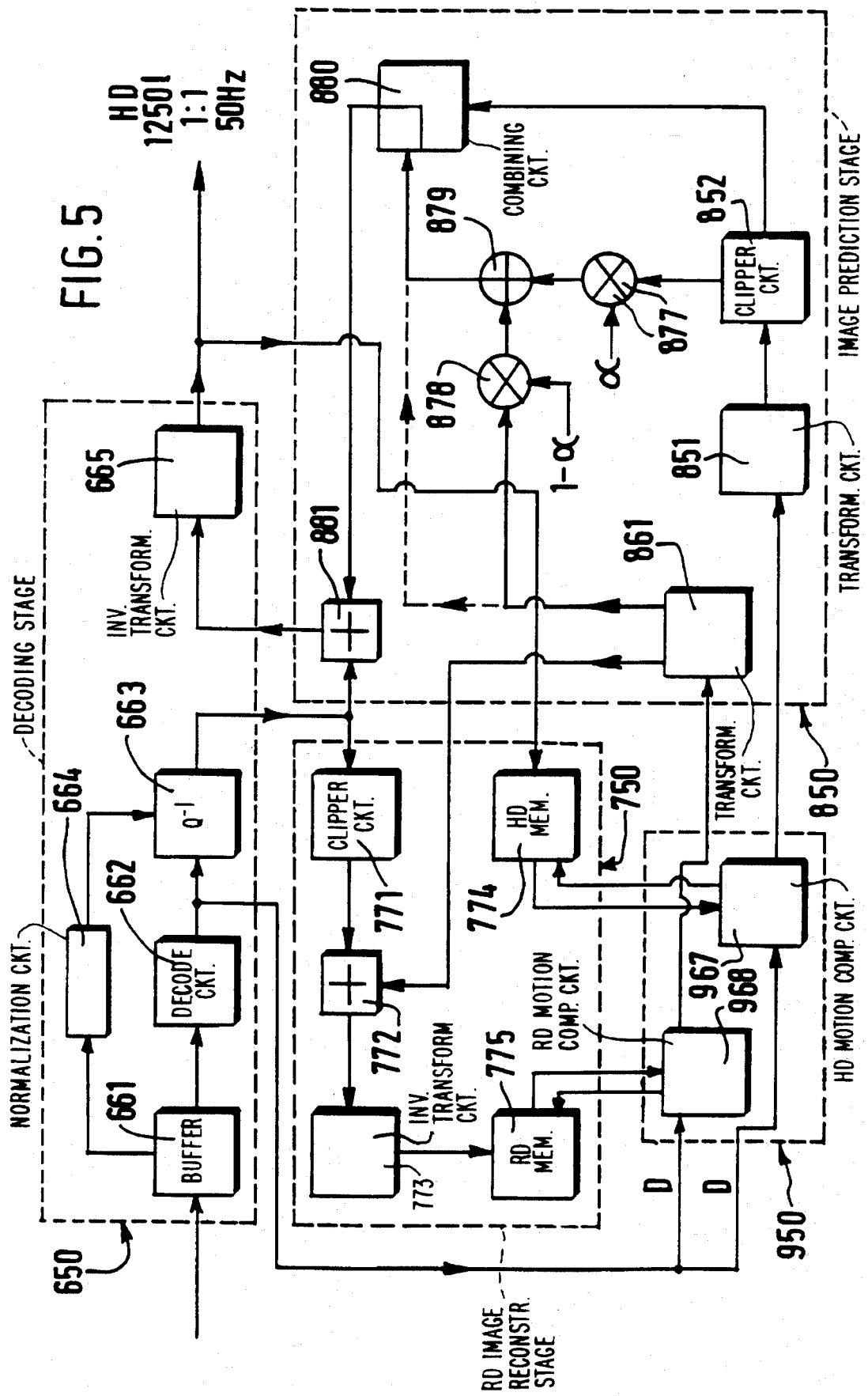

The decoding device shown in a second embodiment in FIG. 5 likewise comprises a variable length decoding stage 650 constituting the decoding chain. This stage 650 comprises a buffer memory 661 receiving the input signals to the decoding device (the previously coded digital signals and the coding mode and motion information components), followed by a variable length decoding circuit 662, an inverse quantizing circuit 663 (connected to the buffer memory 661 via an inverse normalization circuit 664) and an inverse orthogonal transform circuit 665 (inverse DCT). In the device of FIG. 5 the stage 650 thus described constitutes a first path for reconstructing a high-definition image whose output signal is memorized in a first memory 774 to be described hereinafter.

The decoding device also comprises a stage 750 for reconstructing the reduced definition image, here a compatible TV image. This stage 750 constitutes a second path for reconstructing a reduced definition image, which path comprises a series arrangement of a clipper circuit 771 for selecting a given fraction (here a quarter) of the decoded signals, which circuit 771 is arranged at the output of the inverse quantizing circuit 663. This circuit 771 is followed by an adder 772 for reconstituting the block in accordance with the reduced definition, then an inverse orthogonal transform circuit 773 and a second memory 775 for storing information components in accordance with the reduced definition image. The stage 750 is completed by the first memory 774 for storing high-definition image information components, which stage receives the decoded signals which are present at the output of the decoding stage 650, i.e. of the first reconstruction path.

As described hereinbefore, the additional transmitted and/or stored information components (coding mode and motion information components) are applied to the stage 750 and to a motion compensation stage 950. This stage 950 comprises two motion compensation circuits 967 and 968 receiving the output signal of the two memories 774 and 775 of said image reconstruction stage and said motion information components (after their decoding) and is actually a circuit for addressing the memories 774 and 775, respectively, taking the block displacements indicated by said motion information components into account.

The blocks thus reconstructed with motion compensation are then applied to a prediction stage 850 comprising a first and a second reconstitution branch of high-definition and reduced definition, respectively, and, at their output, a circuit for combining the signals which they supply. The first reconstitution branch (for high definition) comprises a first orthogonal transform circuit 851 and a low-frequency clipper circuit 852 for eliminating, from the coefficients resulting from said orthogonal transform, a given fraction representing the coefficients of the lowest frequency, while the second reconstitution branch (for reduced definition) comprises a second orthogonal transform circuit 861. At the output of these first and second parallel branches, a circuit 880 derives the signals provided by the low-frequency clipper circuit 852 and the second orthogonal transform circuit 861 and combines them so as to constitute predicted signals. These output signals of the combination circuit 880 are applied to the second input of an adder 881 whose first input receives the output signals of the inverse quantizing circuit 663. This adder 881 is arranged between said circuit 663 and the circuit 665 of the decoding chain 650.

The present invention is not limited to the embodiments described hereinbefore, which embodiments may be modified without passing beyond the scope of the invention. In a second embodiment of the coding device of FIG. 3 described hereinbefore it is particularly possible to provide a weighting in the image reconstitution circuit, which weighting is analogous to that provided in the first embodiment of FIG. 1 at the output of the two reconstruction paths. As indicated by the solid lines in FIG. 3 (while in the absence of this modification the direct connection between the output of the second branch and the corresponding input of the combination circuit 480 is shown in broken lines in this FIG. 3) said image reconstitution circuit comprises circuits which are similar to those already described, viz a multiplier 471 for multiplying the output signal of the low-frequency clipper circuit 453 by a coefficient α to between 0 and 1, which signal corresponds to said eliminated coefficients in the case of the first embodiment using a direct connection, a multiplier 472 for multiplying the output signal of the other branch by the coefficient (1-α) and an adder 473 for adding the output signals of said multipliers. The output signal of the adder 473 is applied to that input of the combination circuit 480 which, in the case of the direct connection shown in broken lines, would receive the output signal of the second branch.

In the second embodiment, as shown in the decoding device of FIG. 5, it is alternatively possible to provide a weighting in the prediction stage, which weighting is analogous to that which is provided also in the prediction stage in the first embodiment of FIG. 4. This weighting can likewise be realised with the aid of two multipliers and one adder: as is indicated in solid lines in FIG. 5 (while in the absence of this modification the direct connection between the output of the second branch and the corresponding input of the combination circuit 880 is shown in broken lines in the same Figure), a multiplier 877 receives the output signal of the first branch and multiplies it by a coefficient α between 0 and 1, a multiplier 878 receives the output signal of the other branch and multiplies it by the coefficient (1-α), and the adder 879 receives the output signals of these two multipliers and applies its output signal to that input of the combination circuit 880 which, in the case of direct connection, would receive the output signal of the second branch.

The memory 774 for storing high-definition information components is herein considered to be incorporated in the stage 750 but may alternatively be considered to form part of the stage 650. This modification is easy to understand and is not shown in FIG. 5.

We claim:

1. Apparatus for coding a digital signal received at an input thereof representing successive frames of a relatively high definition video image, comprising:

a coding mode selection stage for selecting and applying a frame coding mode (intraframe/interframe) for each of a series of blocks of the received signal corresponding to respective subdivisions of the respective image frames, such selection for each image frame being on the basis of comparison with predicted digital signal blocks derived by prediction from corresponding signal blocks of a previous image frame, and supplying the frame coded digital signal blocks at an output of said coding mode selection stage;

a transform coding stage coupled to the output of said coding mode selection stage for coding the frame coded digital signal blocks in accordance with an orthogonal transform;

an image reconstruction stage coupled to said coding mode selection stage and to said transform coding stage and having a first circuit path which includes means for deriving from signal blocks supplied by the transform coding stage decoded signal blocks representing a reconstruction of image frames in accordance with said relatively high definition;

a motion estimating stage coupled to the input of said coding apparatus to receive the digital signal to be coded and derive therefrom information indicative of estimated motion between corresponding subdivisions of successive image frames; and an image prediction stage for receiving the decoded signal blocks produced by said image reconstruction stage and the estimated motion information produced by said motion estimating stage, and deriving therefrom predicted digital signal blocks which are supplied to said coding mode selection means for use in performing said coding mode selections for successive received signal blocks to be coded;

characterized in that:

said image reconstruction stage further has a second circuit path in parallel with said first circuit path and which includes means for deriving, from signal blocks supplied from said first circuit path, decoded signal blocks representing reconstruction of image frames in accordance with a relatively reduced definition; and said image prediction stage comprises (i) image prediction circuit means and (ii) combining circuit means for deriving a weighted combination of the decoded signal blocks produced by said first and second circuit paths, thereby forming combination signal blocks which are supplied to said motion estimating stage for use in deriving estimated motion information; the combination signal blocks also being supplied together with said estimated motion information to said image prediction circuit for use thereby in deriving predicted signal blocks for said coding mode selection stage in performing frame coding mode selection for successive image frames of the received digital signal.

2. Coding apparatus as claimed in claim 1, in which said transform coding stage is a variable length coding chain comprising a series arrangement of an orthogonal transform circuit, a scanning conversion circuit, a quantizing circuit, a variable length transform coding circuit, and a memory; and said first path of the image reconstruction stage comprises a series arrangement of:

an inverse quantizing circuit coupled to the quantizing circuit of said transform coding stage;

an inverse scanning conversion circuit;

a first inverse orthogonal transform circuit; and a circuit for producing from signal blocks provided by said first inverse transform circuit signal blocks which represent reconstruction of images frames in accordance with said relatively high definition;

said second path of the image reconstruction stage comprises a series arrangement of:

said inverse quantizing circuit;

said inverse scanning conversion circuit;

a clipper circuit for taking a predetermined fraction of signal blocks produced at the output of said inverse scanning conversion circuit;

a second inverse orthogonal transform circuit;

a circuit for producing from signal blocks provided by said second inverse transform circuit signal blocks representing reconstruction of image frames in accordance with said relatively reduced definition;

a memory for storing said reduced definition signal blocks; and a motion compensation circuit having an input for receiving the reduced definition signal blocks from said memory and an output for supplying estimated motion information to said circuit for producing signal blocks representing image frames in accordance with said reduced definition;

said combining circuit means of said image prediction stage comprises:

a first multiplier for multiplying the signal blocks produced by said first image reconstruction path by a coefficient $\alpha$ between 0 and 1;

a second multiplier for multiplying the signal blocks produced by said second image reconstruction path by a coefficient $(1-\alpha)$, a phase restoring and resampling circuit being included between the output of said second image reconstruction path and said second multiplier;

an adder coupled to outputs of the first and second multipliers for adding the multiplied signal blocks produced thereby; and a weighting memory coupled to the output of said adder for storing signal blocks produced thereby.

3. Coding apparatus as claimed in claim 2, wherein said predetermined fraction is one-quarter.

4. Apparatus for decoding coded digital signals which have been formed by coding of digital signal blocks which represent respective subdivisions of successive frames of a relatively high definition video image, the coding including quantizing, orthogonal transformation, image frame prediction based on estimation of motion between successive image frames, and selection of a frame coding mode (interframe/intraframe) for each signal block of a present image frame on the basis of comparison with a predicted signal block derived by prediction from a corresponding signal block of a previous image frame, the coded digital signals including signals indicative of said motion estimation and coding mode selection; said decoding apparatus comprising:

a decoding stage for subjecting the coded digital signals to decoding on the basis of the coding mode selection signals, comprising a series arrangement of a memory, a variable length decoding circuit, an inverse quantizing circuit, an inverse scanning conversion circuit, and an inverse orthogonal transform circuit;

an image reconstruction stage for receiving decoded orthogonal transform signals produced by the decoding stage and deriving therefrom digital signals corresponding to said image frames but of relatively reduced definition, comprising a series arrangement of:
  a clipper circuit for taking a predetermined fraction of the orthogonal transform signals;
  an inverse orthogonal transform circuit for deriving digital signal blocks corresponding to said fraction of the orthogonal transform signals;
  an adder having a first input coupled to the output of said inverse orthogonal transform circuit;
  a memory for storing digital signal blocks produced at an output of said adder and which correspond to image frames reconstituted in accordance with said reduced definition; and
  a first motion approximation circuit for receiving the stored digital signal blocks from said memory and motion estimation signals from said decoding stage, and deriving therefrom motion estimation information which is supplied to a second input of said adder;
an image prediction stage for deriving predictions of motion between successive image frames on the basis of the reduced definition digital signal blocks stored in the memory of the image reconstruction stage, comprising:
  a first multiplier for multiplying output signals produced by the decoding apparatus by a coefficient $\alpha$ between 0 and 1;
  a second multiplier for multiplying output signals of the image reconstruction stage by a coefficient $(1-\alpha)$;
  an adder for adding the outputs of said first and second multipliers, the result of said addition being a weighted mixture of digital signals corresponding to image frames in accordance with said relatively high definition and image frames in accordance with said relatively reduced definition; and
  a memory for storing the digital signals produced by said adder;
a motion compensation stage coupled to the output of said decoding stage and to said memory of the image prediction stage, comprising:
a second motion compensation circuit for receiving the digital signal blocks stored in the memory of said image prediction stage and the motion estimation signals from said decoding stage, and deriving therefrom motion compensation signals; and
  a further adder for combining output signals of said decoding stage with the motion estimation signals produced by said second motion compensation circuit so as to derive motion compensated digital signal blocks corresponding to image frames in accordance with said relatively high definition.

5. Apparatus for decoding coded digital signals which have been formed by coding of digital signal blocks which represent respective subdivisions of successive frames of a relatively high definition video image, the coding including quantizing, orthogonal transformation, image frame prediction based on estimation of motion between successive image frames, and selection of a frame coding mode (interframe/intraframe) for each signal block of a present image frame on the basis of comparison with a predicted signal block derived by prediction from a corresponding signal block of a previous image frame, the coded digital signals including signals indicative of said motion estimation and coding mode selection; said decoding apparatus comprising:
  a decoding stage for subjecting the coded digital signals to decoding on the basis of the coding mode selection signals, comprising a series arrangement of a memory, a variable length decoding circuit, an inverse quantizing circuit, an inverse scanning conversion circuit, and an inverse orthogonal transform circuit;
  an image reconstruction stage for receiving decoded orthogonal transform signals produced by the decoding stage and deriving therefrom digital signals corresponding to said image frames but of relatively reduced definition, comprising a series arrangement of:
    a clipper circuit for taking a predetermined fraction of the orthogonal transform signals;
    an adder for combining the signals produced by said clipper circuit with image prediction information so as to derive orthogonal transform signals corresponding to image frames in accordance with said relatively reduced definition;
    an inverse orthogonal transform circuit for converting the orthogonal transform signals into digital signal blocks corresponding to reconstruction of image frames in accordance with said relatively reduced definition; and
    a first memory for receiving and storing the reduced definition digital signal blocks;
  a second memory comprised in said image reconstruction stage for storing digital signal blocks corresponding to reconstructed image frames in accordance with said relatively high definition;
  a motion compensation stage comprising first and second motion compensation circuits for respectively receiving signal blocks from said first and second memories of said image reconstruction stage and also receiving said motion estimation signals derived by said decoding stage from the coded digital signals, and producing therefrom motion compensation signals for said high definition image frames and further motion compensation signals for said reduced definition image frames; and
  an image prediction stage for receiving and combining predetermined portions of the high and low definition motion compensation signals produced by said motion compensation stage, to thereby derive image prediction information for said image reconstruction stage and motion compensation information for correction of digital signal blocks produced by said decoding stage corresponding to image frames in accordance with said relatively high definition.

6. Decoding apparatus as claimed in claim 5, wherein the image prediction stage comprises first and second image reconstitution branches respectively for higher and lower definition image frames, and further comprises a weighted mixing circuit which includes:
  a first multiplier for multiplying the output of said first branch by a coefficient $\alpha$ between 0 and 1;
  a second multiplier for multiplying the output of said second branch by the coefficient $(1-\alpha)$;
  an adder for adding the outputs of said first and second multipliers; and
  a combining circuit for combining the output of said adder with a predetermined fraction of an orthogonal transform of the output of said second motion compensation circuit of the motion compensation stage.

7. Decoding apparatus as claimed in claim 6, wherein said predetermined fraction is ¼.

8. Apparatus for coding a digital signal received at an input thereof and which represents successive frames of a relatively high definition video image comprising:
  a coding mode selection stage which comprises a series arrangement of (i) an orthogonal transform circuit for receiving and orthogonally transforming each of a series of blocks of the received digital signal corresponding to respective subdivisions of the respective image frames, and (ii) an interframe/intraframe decision circuit for selecting and applying a frame coding mode (interframe/intraframe) to each of the transformed signal blocks produced by the orthogonal transform circuit; said selection for each image frame being on the basis of comparison with predicted signal blocks derived by prediction from corresponding signal blocks of a previous image frame; the frame coded digital signal blocks being supplied at an output of said coding mode selection stage;

a transform coding stage coupled to the output of said coding mode selection stage for coding the frame coded digital signal blocks in accordance with an orthogonal transform; said transform coding stage comprising a series arrangement of a quantizing circuit, a variable length coding circuit and a memory;

an image reconstruction stage coupled to said coding mode selection stage and to said transform coding stage and having a first circuit path in parallel with a second circuit path, and wherein:

said first circuit path comprises a series arrangement of
an inverse quantizing circuit coupled to the quantizing circuit of said transform coding stage;
a circuit for producing from signal blocks provided by said inverse quantizing circuit a reconstruction of signal blocks representing orthogonal transforms of image frames in accordance with said relatively high definition;
a first inverse orthogonal transform circuit; and
a first memory for storing signal blocks produced by said first inverse orthogonal transform circuit representing a reconstruction of image frames in accordance with said relatively high definition;

said second circuit path comprises a series arrangement of said inverse quantizing circuit;
a clipper circuit for taking a predetermined fraction of the signal blocks produced at the output of said inverse quantizing circuit;
a circuit for producing from signal blocks provided by said clipper circuit signal blocks representing a transform of image frames in accordance with said relatively reduced definition;
a second inverse orthogonal transform circuit; and
a second memory for storing signal blocks produced by said second inverse orthogonal transform circuit representing a reconstruction of image frames in accordance with said relatively reduced definition;

a motion estimating stage coupled to the input of said coding apparatus to receive digital signal to be coded and derive therefrom information indicative of estimated motion between corresponding subdivisions of successive image frames; and an image prediction stage for receiving the decoded signal blocks produced by said image reconstruction stage and the estimated motion information produced by said motion estimating stage, and deriving therefrom predicted digital signal blocks which are supplied to said coding mode selection stage for use in selecting a frame coding mode for each of the successive blocks of the received signal to be coded;

said image prediction stage comprising
coupled to the output of said first circuit path, a first image reconstitution branch comprising in series a first image prediction circuit which provides high definition frame prediction with motion compensation, a first orthogonal transform circuit, and a low-frequency clipper circuit which eliminates a predetermined fraction of orthogonal transform coefficients provided by said first orthogonal transform circuit, said predetermined fraction corresponding to low frequency components of the high definition predicted image frames;
coupled to the output of said second circuit path a second image reconstitution branch comprising in series a second image prediction circuit which provides reduced definition image frame prediction with motion compensation, and a second orthogonal transform circuit; and
combining circuit means for combing the outputs of said first and second image reconstitution branches so as to form said predicted digital signal blocks supplied to said coding mode selection stage.

9. Coding apparatus as claimed in claim 8, wherein the image prediction stage further comprises, coupled between the outputs of said first and second image reconstitution branches and said combining circuit means, a weighted mixing circuit comprising:
a multiplier for multiplying the output signals of said first branch by a coefficient $\alpha$ between 0 and 1;
a further multiplier for multiplying the output signals of said second branch by a coefficient $(1-\alpha)$; and
an adder for adding the output signals produced by said multipliers and supplying the resulting signals to said signal combining means.

10. Coding apparatus as claimed in claim 9, wherein said predetermined fraction is one-quarter.

11. Coding apparatus as claimed in claim 8, wherein said predetermined fraction is one-quarter.

* * * * *